United States Patent
Romano

(10) Patent No.: US 11,110,694 B2
(45) Date of Patent: Sep. 7, 2021

(54) PACKAGING MATERIAL

(71) Applicant: SOREMARTEC S.A., Findel (LU)

(72) Inventor: Igor Romano, Olm (LU)

(73) Assignee: SOREMARTEC S.A., Findel (LU)

( * ) Notice: Subject to any disclaimer, the term of this patent is extended or adjusted under 35 U.S.C. 154(b) by 177 days.

(21) Appl. No.: 16/413,289

(22) Filed: May 15, 2019

(65) Prior Publication Data
US 2019/0351661 A1 Nov. 21, 2019

(30) Foreign Application Priority Data

May 16, 2018 (LU) ..................................... 100799

(51) Int. Cl.
| | |
|---|---|
| B32B 27/36 | (2006.01) |
| B32B 27/20 | (2006.01) |
| B32B 27/28 | (2006.01) |
| B32B 27/32 | (2006.01) |
| B65D 65/38 | (2006.01) |
| C08K 3/013 | (2018.01) |
| A01N 25/34 | (2006.01) |
| C08K 3/34 | (2006.01) |
| C08L 5/08 | (2006.01) |
| C08L 71/00 | (2006.01) |
| C08L 67/04 | (2006.01) |

(52) U.S. Cl.
CPC .............. *B32B 27/36* (2013.01); *B32B 27/20* (2013.01); *B32B 27/285* (2013.01); *B32B 27/32* (2013.01); *B65D 65/38* (2013.01); *A01N 25/34* (2013.01); *B32B 2307/7244* (2013.01); *B32B 2439/70* (2013.01); *C08J 2300/16* (2013.01); *C08K 3/013* (2018.01); *C08K 3/34* (2013.01); *C08L 5/08* (2013.01); *C08L 67/04* (2013.01); *C08L 71/00* (2013.01); *Y10T 428/1352* (2015.01)

(58) Field of Classification Search
CPC ...... C08K 3/34; C08K 5/01; C08K 2003/265; C08K 2201/012; C08K 3/013; C08K 5/0058; C08K 9/10; C08L 5/08; C08L 67/04; C08L 71/00; C09D 175/04; C09D 105/08; C09D 105/16; A21D 15/00; A23L 3/3472; B32B 2307/7244; B32B 2439/70; B32B 27/20; B32B 27/285; B32B 27/32; B32B 27/36
See application file for complete search history.

(56) References Cited

U.S. PATENT DOCUMENTS

| | | | |
|---|---|---|---|
| 10,858,175 B2 * | 12/2020 | Romano | ................ B65D 85/36 |
| 2008/0220036 A1 | 9/2008 | Miltz et al. | |
| 2009/0117389 A1 | 5/2009 | Amberg-Schwab et al. | |
| 2009/0324683 A1 * | 12/2009 | Evans | .................. A61K 9/0024 424/426 |
| 2010/0178268 A1 * | 7/2010 | Bukshpan | .............. A01N 37/08 424/78.08 |
| 2013/0273135 A1 * | 10/2013 | Brooks | ............... A61L 27/3608 424/426 |
| 2016/0243243 A1 * | 8/2016 | Bouchemal | ........ A61K 47/6939 |
| 2019/0281845 A1 * | 9/2019 | Tapia Villaneuva | ........................ B41M 5/0047 |

FOREIGN PATENT DOCUMENTS

| | | |
|---|---|---|
| EP | 2 414 436 A2 | 2/2012 |
| KR | 20160067375 A | 6/2016 |
| WO | 2010057658 A2 | 5/2010 |
| WO | 2010120435 A2 | 10/2010 |
| WO | 2017/106984 A1 | 6/2017 |

OTHER PUBLICATIONS

Vasicek, Stanislav et al,. "A packaging multilayer film with antimicrobial effects and method of its production", Database CA, Chemical Abstracts Service, Columbus, Ohio, US; Apr. 25, 2017, XP-002788153, 1 page.
M. Abdollahi et al., "A novel active bionanocomposite film incorporating rosemary essential oil and nanoclay into chitosan", Journal of Food Engineering, vol. 111, Feb. 16, 2012, 8 pages.
K. B. Biji et al., "Smart packagining systems fro food applications: a review", J. food Sci. Technol., vol. 52, No. 10, Feb. 17, 2015, 12 pages.
Search Report and Written Opinion issued for Luxembourg Application No. 100799 dated Jan. 18, 2019, 10 pages.

* cited by examiner

*Primary Examiner* — Ling Siu Choi
*Assistant Examiner* — Gennadiy Mesh
(74) *Attorney, Agent, or Firm* — Rothwell, Figg, Ernst & Manbeck, P.C.

(57) ABSTRACT

Packaging material for food products with antimicrobial and antifungal properties including:
a) a core layer of polymeric material including at least one active substance having antimicrobial and/or antifungal activity dispersed in the polymer matrix,
b) a coating applied to a side of the core layer obtained from a lacquer or a polymeric paint including nano-fillers of a phyllosilicate or hydrotalcite,
c) a coating for the release of an active antimicrobial or antifungal agent comprising encapsulated ethanol and a polymeric component selected from chitosan grafted with polyethylene glycol or cyclodextrin, a mixture of chitosan and polyethylene glycol and a polymer or mixture of polymers for printable paint applied to other side of the base layer; optionally the material further comprises:
d) a coating with oxygen scavenger activity applied to the coating layer c) and/or a further coating e) including active substances of type b).

18 Claims, 3 Drawing Sheets

PACKAGING MATERIAL

CROSS REFERENCE TO RELATED APPLICATION

This application claims the benefit of Luxembourg Patent Application No. 100799 filed on May 16, 2018, the disclosure of which is incorporated by reference in its entirety.

The present invention relates to a packaging material for food products, having antimicrobial and antifungal properties, particularly properties of inhibition of mold growth.

More particularly, the invention relates to a material in the form of a film or sheet for use in "active" packaging systems, capable of inhibiting the growth of microorganisms on the surface of the food product packaged therein.

In relation to active packaging systems, KR 20160067375 describes an antimicrobial film that contains a plant extract selected from grape seed extract, ginger extract and phellodendron bark as an antimicrobial additive, capable of inhibiting bacterial decomposition of a food product packed in the film.

WO2010057658 describes a process for the production of a film of thermoplastic material such as LDPE, PLA or PCL including substances with antimicrobial activity selected from thymol, lemon extract and lysozyme.

US 2008220036 describes a food packaging material which includes a coating comprising a mixture of a natural essential oil such as linalool, methylchavy, geraniol, citral, methyl cinnamate, methylugenol, 1,8-cinemol, trans-alpha-bergamotene, carvacrol and thymol, mixed with polymers such as ethylene vinylalkol copolymer, polyacrylates, ionomers, polyamides and other hydrophilic polymers or having functional groups capable of partially fixing additives; the coating is applied to a food packaging film or is incorporated in such a film. A binding agent such as PEG may be added to the mixture to improve retention of the volatile oil during the production process.

An object of the present invention is to provide an improved packaging film for the production of active packaging which is capable of inhibiting or substantially delaying the growth of microorganisms, fungi and molds on food products both in the case where the food product is in close contact with the packaging material, and in the case where there is a head space between the product and the envelope formed by such a material.

SUMMARY OF THE INVENTION

In view of the above purpose, an object of the invention is a packaging material having the features defined in the following claims.

Another object of the invention is a package including a food product, particularly a bakery product, made with the use of the above packaging material or comprising said material.

The packaging material according to the invention comprises:
a) a core layer of polymeric material including active substances having antimicrobial and/or antifungal activity dispersed in the polymer matrix,
b) a coating applied to a side of the core layer obtained from a lacquer or a polymeric paint including nanofillers of a phyllosilicate or hydrotalcite, and
c) a coating for the release of an active antimicrobial or antifungal agent comprising encapsulated ethanol and a polymeric component selected from chitosan grafted with polyethylene glycol or cyclodextrin, a mixture of chitosan and polyethylene glycol and a polymer or mixture of polymers for printable paint, applied to other side of the core layer.

In a preferred embodiment, the packaging material may comprise one or both of the following further coating layers:
d) an oxygen scavenger coating applied to the above coating layer c), and/or
e) a polymeric coating including active substances having antimicrobial and/or antifungal activity of the a) type mentioned above, applied to the above coating layer c), or to the coating layer d).

SUMMARY DESCRIPTION OF THE FIGURES

DETAILED DESCRIPTION OF THE INVENTION

The invention relates to packaging materials for food products and has been developed with particular regard to the packaging of bakery products, optionally including a filling, in order to extend the shelf-life thereof, particularly in relation to microbiological and organoleptic property deterioration.

In particular, the invention relates to a packaging material in the form of a film or sheet for the production of sealed packages, obtained from a single sealed envelope sheet with hot or cold sealing bands, for example of the flow pack type (see EP-A-0 957 043) or obtained with two or more wrapping sheets welded one to the other(s).

However, the packaging material in the form of a film or sheet can also be applied to the production of thermoformed packages or containers by applying the film or sheet to a thermoformable substrate, for example for the production of FFS (Form, Fill, Seal) containers.

With reference to sealed packages of the above type, which require the presence of a hot or cold sealing material in the welding regions, i.e. in the regions in which the edges of the sheet or wrapping sheets are overlapped and welded, it is intended that the layered structure of the packaging material described herein is applied to the regions of the film or sheet which in the package appear facing or in contact with the food product.

In other words, the definition of film or sheet packaging material, provided herein, having a multilayer structure, comprising active coatings, does not imply a homogeneous film or sheet material over its entire flat extent, it being therefore understood that such a multilayer structure does not necessarily have to be present in the welding regions of the package.

Figure 1:
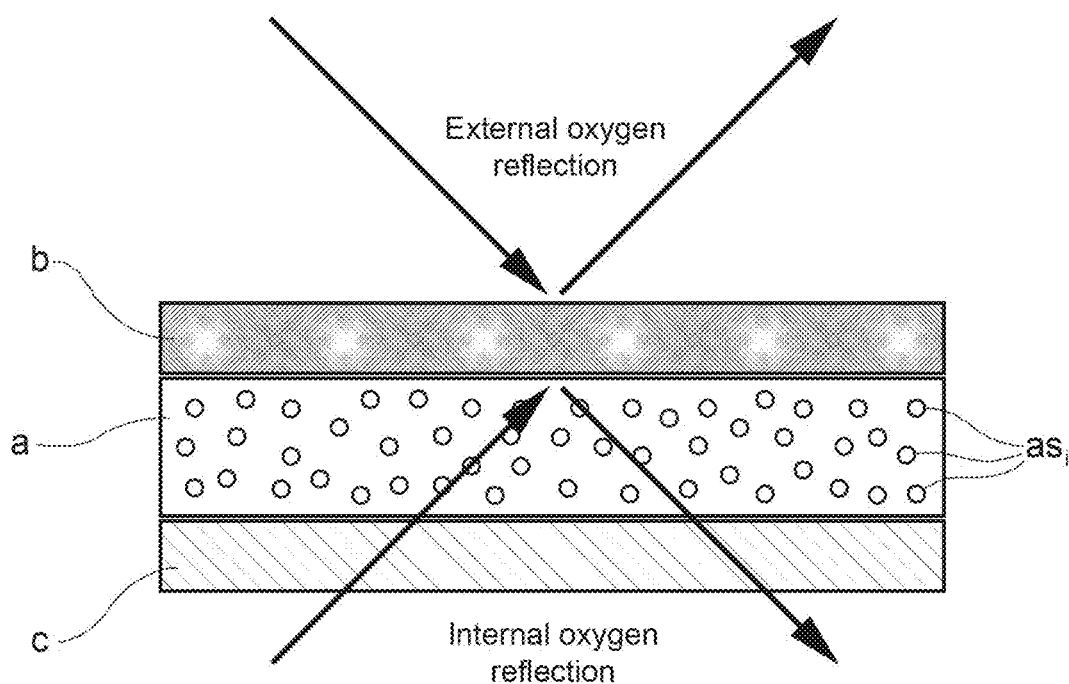
FIG. 1 is a schematic representation of a three-layer structure of the packaging material according to the invention.

With reference to the drawings, FIG. 1 illustrates the structure of a multilayer film or sheet comprising layers a), b) and c) described in detail below.

The core layer a) including active substances, indicated with $as_i$ in the accompanying drawings, constitutes the structural layer that determines the mechanical properties of the packaging material. Reference $as_i$ is used in the accompanying drawings to indicate the presence of one or more active substances, for example $as_1$, $as_2$ . . . , the use of a single active substance or a mixture of active substances of different chemical nature being included in the scope of the invention.

It may be a monolayer film or preferably a coextruded film comprising a main layer, of larger thickness, and thinner surface layers, on one or both sides of the main layer, adapted to carry out additional functions, for example, having weldability or printability features. It is understood that the above thin coextrusion layers, which in any case may also include active substances, must not interfere with the release of the active substances included in the main layer.

The core layer film can be obtained by conventional bubble extrusion techniques (film blowing) or cast extrusion with possible biaxial orientation.

The film may include antioxidant agents (e.g. Irganox®, Irgafos®), antinucleating agents and sliding agents conventionally used in plastics.

Furthermore, the core layer may be a coupling of coextruded films, for example a coupling of coextruded polypropylene and coextruded and bi-oriented polyethylene terephthalate. The core layer a) may further comprise a metallization coating on the surface which will be turned outwards in the packaging application, obtained by a high vacuum metallization process, for example with aluminum deposition.

The term core layer therefore comprises within its scope multilayer structures in which, at least in one of the thicker layers, active substances with antimicrobial and/or antifungal functions are incorporated.

The polymeric material of the core layer may preferably be selected from polyethylene, polypropylene, ethylene-propylene copolymers, polyesters and degradable polymers, such as poly(lactic acid) (PLA), polyhydroxyalkanoate (PHA) such as polyhydroxybutyrate (PHB) and polycaprolactone (PCL).

The active substances $as_i$, dispersed in the polymeric matrix, include essential oils and components thereof, plant extracts, polysaccharides, such as alginates and chitosan, encapsulated ethanol and mixtures thereof, but are not limited to these. The active substances may therefore include the substances previously mentioned with reference to the prior art.

The active substances are preferably selected from the following and mixtures thereof:
  chitosan: chitosan is a linear polysaccharide composed of D-glucosamine and N-acetyl-D-glucosamine, bound by beta bonds (1-4). Its antibacterial and antifungal properties are known;
  alginic acid and alginates;
  grapefruit seed extract (or citrus seed extract): it is a liquid extract derived from grapefruit seeds, pulp and white membranes. It is known as a natural antimicrobial agent containing flavanones, naringin and hesperidin;
  lemon peel essential oil: it is a liquid extract containing mainly limonene;
  tea tree oil (Melaleuca alternifolia oil): essential oil distilled from the tea tree, whose antiseptic, antifungal, antibacterial and antiviral properties are known; its main active component is terpinene-4-ol (about 40%);
  cinnamon oil: liquid extract obtained from the leaves of cinnamon comprising linalool as main component (about 36%);
  thyme oil and main components thereof, such as thymol, p-cymene, estragol, linalool and carvacrol;
  encapsulated ethanol: ethanol in the core layer structure is used in powder form, preferably encapsulated by a spray drying method. The encapsulating film can be dextrin-based, also known as maltodextrin (polysaccharides) (CAS number 9050-36-6), a substance produced from corn partly by hydrolysis and commercially available as a white powder dried with gas. The process comprises the preparation of a mixture of dextrin and ethanol, the application of one-shot spray drying so that the mixture is transformed into small droplets/granules; through heat, dextrin forms the external film. The alcohol at the end of the process contained in the drops/granules can reach up to 40%. However, other encapsulation techniques may be contemplated, for example in cyclodextrin, provided that the encapsulated product is capable of releasing ethanol vapors over time.

The amount of active substance dispersed in the polymer matrix can widely vary according to the substance used; for solid substances such as chitosan and alginic/alginate acid, it is generally possible to use contents from 1% to 30% by weight, based on the weight of the polymer.

For liquid extracts or essential oils, amounts of from 0.2% to 4% by weight, based on the weight of the polymer, are preferably used.

The active substance or mixture of active substances is incorporated into the polymer matrix in the extrusion process according to known compound extrusion techniques.

Typically, the core layer is a film or sheet having a thickness of between 5 µm and 80 µm.

Coating b) is a coating having oxygen barrier properties, preferably having an oxygen transmission rate lower than 0.2 cc/m$^2$×day at 23° C. and 0% relative humidity. In the practical application of the packaging material, this coating, applied to the surface of the core layer, will be turned towards the outside of the package, i.e. on the opposite side with respect to the food product therein.

The coating can be obtained with the use of a polymeric varnish or lacquer, in solvent or without solvent, including fillers or nano-fillers of a phyllosilicate (nanoclay) or hydrotalcite, preferably in amounts of from 3 to 30% by weight based on the weight of the lacquer or paint. The use of montmorillonite fillers with a size of less than 1 µm is preferable. This lacquer or paint comprises a polymeric component preferably selected from polyethylene terephthalate, polyurethane, polyacrylate, nitrocellulose and vinyl polymers, generally in amounts of from 18 to 28% by weight; the liquid component may be water, ethyl acetate, isopropyl alcohol or ethyl acetate or mixtures thereof. Alternatively, a vinyl alcohol polyethylene coating including or not including the above fillers may be used.

The term "nano" as used herein refers to a maximum dimension in the range from 1 to 1000 nm, preferably from 1 to 100 nm.

Typically, the barrier layer has a weight (dry residue) of more than 0.4 g/m² and less than 3.0 g/m², more preferably less than 2.5 g/m².

The coating can be applied to the surface of the core layer using various technologies such as flexo printing, rotogravure printing or other known film coating technologies; the coating is applied to the surface of the core layer intended to be facing the outside of the package with possible exclusion of the regions of the core layer at which the welding will be carried out.

The surface that is lacquered can also be, in turn, metallized (aluminum oxide and/or silicon oxide).

Layer b) described above is also able to achieve an adequate level of water vapor barrier, with a transmission rate that can reach values below 15 g/m²×24 hours×atmosphere in tropical conditions (38° C.; 90% relative humidity).

In particular, the oxygen barrier layer is able to exert a reflection action of the environmental oxygen, that is, external to the package, as well as a reflection action of the oxygen inside the package, making the volatile and semi-volatile active compounds present in the active substances of the core layer be brought into the headspace of the package.

Coating c), also referred to as the active coating or release layer, is applied to the core layer on the opposite side with respect to the oxygen barrier coating b).

In one embodiment, it may be a coating comprising chitosan grafted with polyethylene glycol or with cyclodextrins and including, preferably, encapsulated ethanol dispersed in chitosan.

Figure 5:
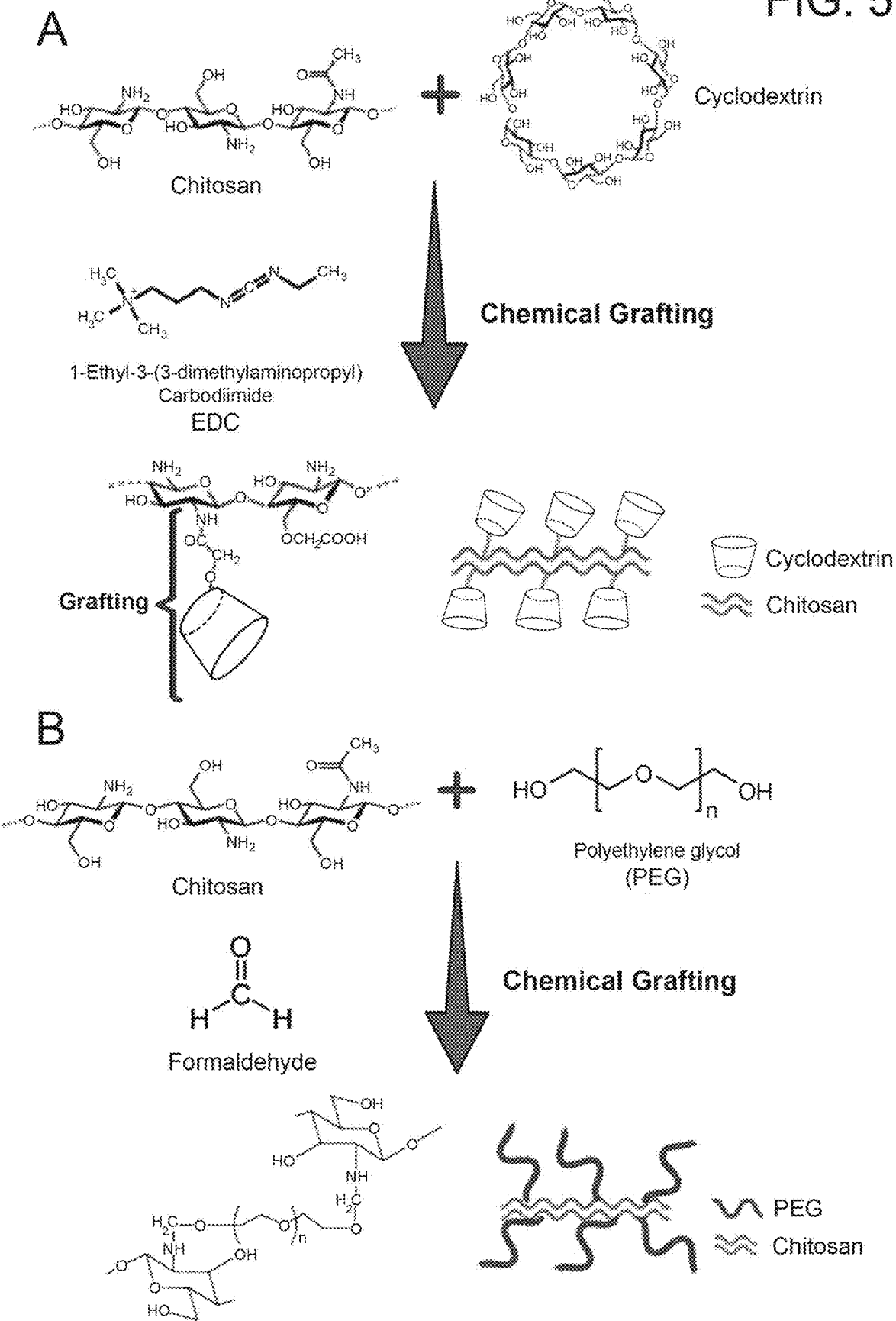
FIG. 5 is a schematic representation of the process for preparing chitosan grafted with cyclodextrin (A) and with PEG (B).

Chitosan grafted with PEG or with cyclodextrin may be obtained by processes known in the literature and described, for example, by E. V. R. Campos et al. in Front Chem. 2017, 5:93 (Doi: 10.3389/F. Chem 2017.00093) and in the literature cited therein; see the preparatory process diagrams in FIG. 5 in this regard.

According to an aspect of the invention, coating c) is obtained by applying a hydrogel comprising chitosan grafted with polyethylene glycol or cyclodextrin, e.g. in amounts of from 40 to 60% by weight, encapsulated ethanol, e.g. in amounts of from 1 to 6% by weight and water.

In another embodiment, coating c) comprises encapsulated ethanol and a mixture of polyethylene glycol and chitosan; this coating is obtained by applying a solution containing chitosan, PEG and encapsulated ethanol in a solvent, such as for example acetylacetate, ethyl acetate or isopropyl alcohol; aqueous solutions can also be used.

This coating c) may also include acetic acid, for example 2%, and a surfactant up to 3% by weight. The preferred surfactant is sorbitan ethoxylate with a molar content of ethylene oxide of less than 300 moles of ethylene oxide per mole of sorbitan.

By way of example, the following printable coating compositions may be used:

i) chitosan: 25% by weight
 PEG: 25% by weight
 ethanol encapsulated in maltodextrin: 1% by weight
 solvent based on acetylacetate: 50% by weight,
 or
 ii) chitosan (90% deacetylation): 15% by weight
 PEG: 30% by weight
 encapsulated ethanol: 2% by weight
 solvent: ethylacetate or isopropyl alcohol or water at 51% by weight.

In general, the total content of PEG and chitosan is from 40 to 60% by weight and the encapsulated ethanol content is from 1 to 6% by weight.

Preferably, the chitosan used having formula (C6H11O4N)n has a molecular weight of from 40 to 250 kDa and different degrees of deacetylation and viscosity.

The PEG used preferably has a melting point of less than 60° C., with a viscosity at 50° C. greater than 35 mm²/s (DIN 51562) with a molecular weight of less than 20000 g/moles and preferably less than 1000 g/moles (DIN 53240).

In another embodiment for obtaining coating c), it is possible to use a printable paint (a paint that can be used for printing) comprising encapsulated ethanol, particularly a paint conventionally used for printing liquid rotogravure inks, preferably including 1-6% by weight of encapsulated ethanol, most preferably 5% by weight in a polymeric matrix (for example polyethylene, polyvinylacetate or polyacrylate) preferably with 25-30% of polymer and 75-80% of solvent such as ethylacetate or a multi-solvent mixture.

Other suitable polymers that may be included in the polymeric matrix of said printable paint include: natural resins such as: shellac, mastic, polyesters, polysaccharides such as: chitosan, pectin, proteins, epoxy resins, polyhydroxyalkanoates (PHA including PUB and PHBH), polyvinyl butyral (PVB), EVOH and mixtures thereof.

The compositions can be applied to the film of the core layer by coating, for example by a helical cylinder and rotogravure printing.

The weight of coating c) is preferably higher than 0.5 g/m² and, preferably, less than 4 g/m².

Coating c) is activated for the release of the active agent in the head space, due to the oxygen permeation dynamics in the core layer which is also related to the temperature and pH of the lacquer itself.

The optional coating d) (see FIG. 3) is a coating having oxygen scavenger activity adapted to reduce the concentration of oxygen in the head space of the package made with the packaging material according to the invention.

Based on the tests carried out by the Applicant, for the purpose of improving the antifungal effect of the package, it is not necessary to achieve a substantial reduction in the concentration of oxygen in the head space, but to generate a reductive perturbation of the concentration thereof, thus activating the swing movement of the active substances released from the core layer a) and/or the active release coating c). For example, it was sufficient to cause an oxygen uptake of only 3% compared to its initial volume in the headspace.

For these reasons, the nature of coating d) is not particularly critical and different solutions can be adopted, as long as they are compatible with food contact.

In one embodiment, coating d) may be obtained by applying a lacquer including iron or iron oxide nano-fillers. Coatings with oxygen scavenger function for packaging films are for example described in EP 2 414 436 and US 2009/0117389, the description of which is to be understood as incorporated herein by reference. Polymeric coatings containing a polymer or copolymer of at least one unsaturated ethyl monomer (e.g. polyisobutylene), with iron or cobalt, may also be used.

Polymeric lacquers containing iron or iron oxide nano-fillers in a polymeric matrix of polyurethane, polyacrylic or polyester may also be used.

In another embodiment, it is possible to use a coating with deoxygenating activity, of an enzymatic nature (such as for example containing the enzyme MYc catalase).

In an embodiment example, a lacquer containing:
 1 to 7% of iron in a solvent-based paint with:

13% to 35% of polymer such as nitrocellulose, vinyl acetate, polyester, polyurethane, with an organic carrier (solvent) (such as ethyl acetate) in amounts from 58% to 86% may also be used.

Of course, slip and stabilizing agents may also be used in this lacquer, such as isocyanates generally in a percentage lower than 2%.

A similar formulation can be used by replacing iron with sodium ascorbate. Water-based lacquers having a formulation similar to the one indicated above with water instead of the organic solvent are also contemplated.

This coating can have a weight greater than $0.3 \ g/m^2$ and generally less than $4 \ g/m^2$.

Figure 3:
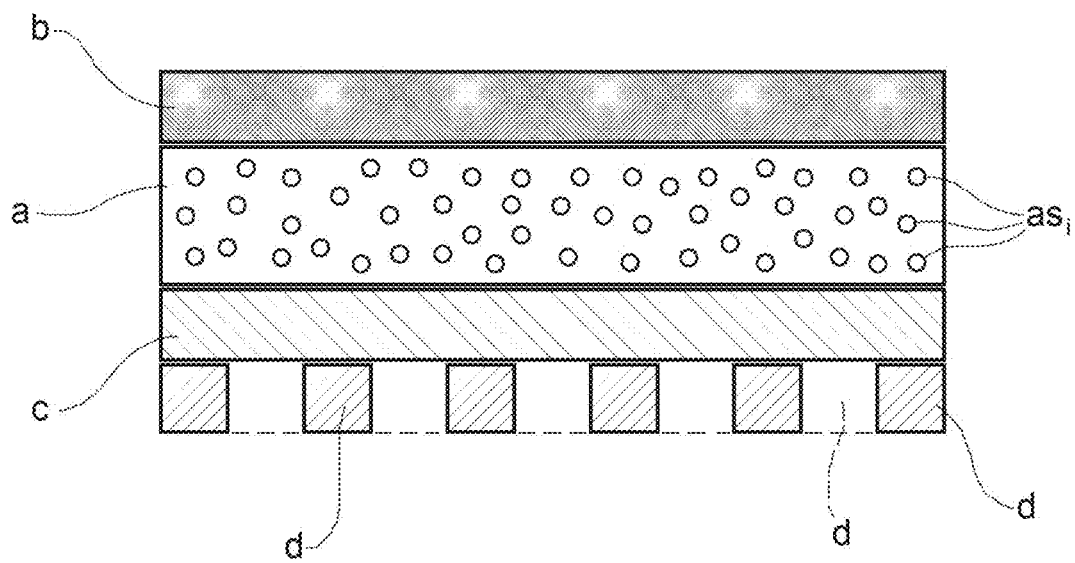
FIG. 3 is a schematic representation of another embodiment of the packaging material with a structure comprising four layers, including in addition to layers a, b and c in FIG. 1, a further coating d, either continuous or discontinuous.

As illustrated in FIG. 3, coating d may be a continuous coating, covering coating c (see broken line in FIG. 3) or a coating applied in strips spaced apart so as to leave regions of coating c uncovered.

Figure 2:
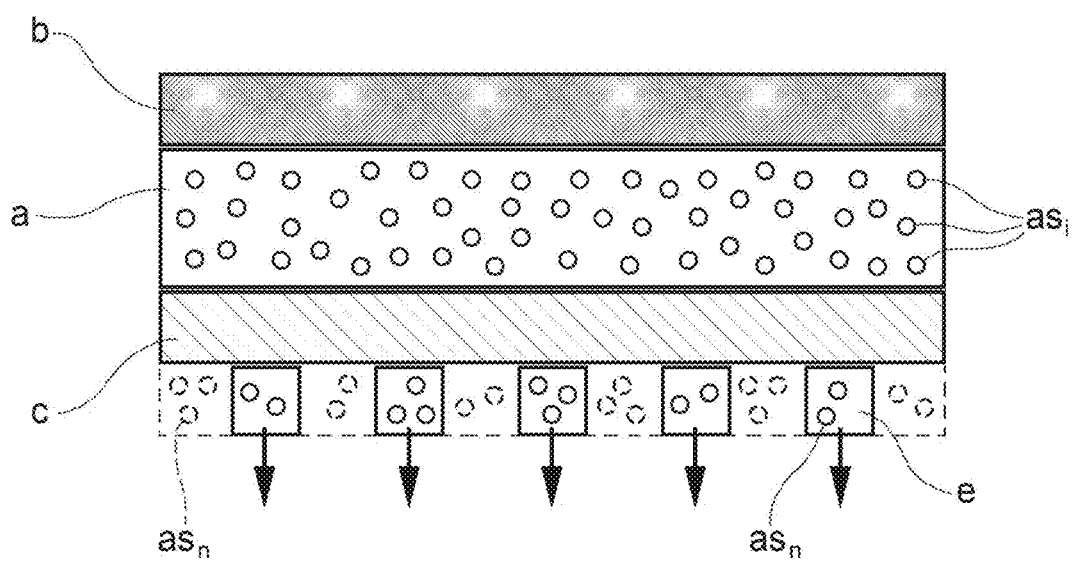
FIG. 2 is a schematic representation of an embodiment of the packaging material comprising a four-layer structure, including, in addition to layers a, b and c in FIG. 1, a further coating of type e, either continuous or discontinuous.
Figure 4:
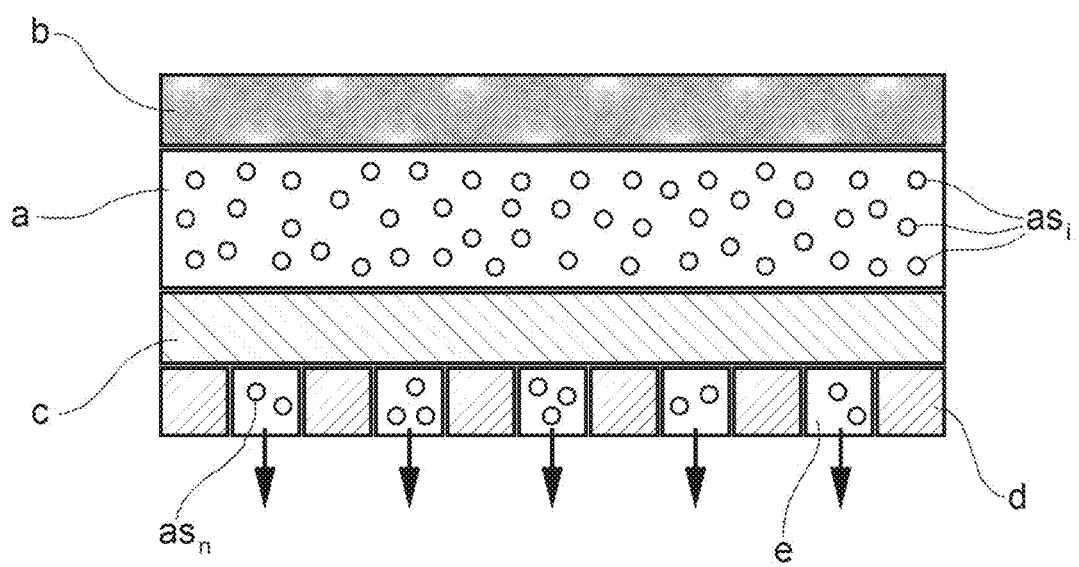
FIG. 4 is a schematic representation of an embodiment of the packaging material with a four-layer structure, comprising in addition to layers a, b and c in FIG. 1, a further coating formed by the alternating coating materials d and e.

The optional coating e) (FIGS. 2 and 4) is a coating containing antimycotic or antimicrobial active substances, indicated with $as_n$, having features similar to those of the core layer, but preferably having a weight generally comprised between $0.5 \ g/m^2$ and $4.5 \ g/m^2$. Reference $as_n$ in FIGS. 2 and 4 is used to contemplate the possible use of a single active substance or a mixture. The coating can be obtained by preparing a lacquer containing a polyurethane, polyacrylic or polyester polymer in water or in a solvent, with a dry percentage preferably lower than 45%.

The content of active substances selected from those indicated above for the core layer is generally between 15% and 60%

Example: solvent 55% by weight
Active substances: 35% by weight
Polymer: 10% by weight As illustrated in FIG. 2, coating e) may be a continuous coating, covering coating c) (see broken line in FIG. 2) or a coating applied according to strips spaced apart so as to leave regions of coating c uncovered.

In the embodiment in FIG. 4, the further coating, applied to coating c, is formed by alternating strips obtained by applying coatings d and e.

EMBODIMENT EXAMPLES

The following examples refer to preferred embodiments of the invention.

Preparation of the Core Layer a)

The most preferred materials for the preparation of the core layer a) include polycaprolactone (PCL), polyhydroxyalkanoate (PHA) polymers and copolymers, in particular polyhydroxybutyrate, or polypropylene. The active agents are preferably selected from grapefruit seed extract (optionally in association with the naringin active agent in solid form), chitosan and/or alginate and mixtures thereof and/or encapsulated ethanol.

Example 1

Preparation of the Core Layer

The core layer is obtained by coextrusion technique by mixing the active agents in the polymer melt.
The following is used:
PCL polymer: 83% by weight
active substances:
lemon peel essential oil: 2% by weight
chitosan (90% deacetylation degree): 15% by weight.

A film having a thickness of 25 μm is obtained having a melting point of about 200° C.; sealing initiation temperature (SIT): 70° C.

Example 2

The preparation method described above is repeated using polyhydroxybutyrate instead of PCL.

Example 3

The procedure of example 1 is repeated using polypropylene instead of PCL.

Example 4

Preparation of the Oxygen Barrier Coating b)

For the preparation of the barrier layer, a polyurethane-based composition is used containing 30% by weight of montmorillonite $(Na,Ca)0.3(Al,Mg)2Si4O10(OH)2.n(H2O)$ in (two-dimensional) lamellar particles with maximum size of less than 0.6 microns×1.4 microns.

The above composition is applied to a side of the core layer by means of a flexographic and rotogravure printing technique, obtaining, after hardening, a weight of $2 \ g/m^2$ with a coating thickness of 2.2 microns.

Example 5

Preparation of the Release Coating c)

For this coating, a composition is used containing:
chitosan grafted with PEG: 25% by weight
PEG: 25% by weight
encapsulated ethanol: 1% by weight
solvent based on acetyl acetate: 50% by weight.

The composition is applied by spreading by means of a helical cylinder and rotogravure printing on the surface of the core layer of the film obtained in example 4 with a residual weight of $2.5 \ g/m^2$ with a thickness of 2.8 microns.

Example 6

Preparation of the Coating with Oxygen Scavenger Activity

For this coating, an aqueous-based lacquer is used comprising 5% by weight of iron nanoparticles and polyvinyl acetate (65% by weight).

Example 7

Comparative

26 μm bi-oriented co-extruded polypropylene packaging film, having a main layer of 23 μm polypropylene homopolymer and two outer layers of polypropylene copolymer of 1.5 μm each, which provide sealing properties.

The film density is 0.91 with a weight of $23.7 \ g/m^2$ and sealing initiation welding temperature (SIT) at 50 m/min. of 95° C.

The transmission features are:
WVTR 6 g/m2×24 h 90% RH; 38° C.;
O2TR 2000 cc/m2×24 h×atm 0% RH; 23° C.;
O2TR 3500 cc/m2×24 h×atm 60% RH; 38° C.

Example 8

Comparative

Packaging film comprising a co-extruded bi-oriented polypropylene film as per example 7, whose surface, intended to be directed towards the outside of the package, is metallized by means of a high vacuum metallization process with aluminum deposition by oxidation at a magnitude above 50 Angstrom. The film is further coupled to another bi-oriented polyethylene terephthalate film (coextruded BOPET, with a thickness of 12 μm, printed internally). The multilayer film has a total thickness, including adhesives and printing inks, of 43 μm with density of 0.91 for PP and 1.34 for PET and with a weight of 39.74 g/m² plus 5 g/m² for inks. The multilayer film has a SIT at 50 m/min of 110° C., due to the presence of external PET.

The transmission features are:
WVTR 0.5 g/m2×24 h 90% RH; 38° C.;
O2TR 50 cc/m2×24 h×atm 0% RH; 23° C.;
O2TR 100 cc/m2×24 h×atm 60% RH; 38° C.

Example 9

Comparative

Packaging films as per example 8, wherein during the coextrusion process of the bioriented PP film, 10% chitosan and 3% alginate by weight in equal weight are included both in the PP layer mixed with homopolymer and in the inner layer of PP copolymer and a slipping agent. The final weight is 46 g/m² with SIT 130° C. at 50 m/min.

The transmission features are:
WVTR 0.5 g/m2×24 h 90% RH; 38° C.;
O2TR 45 cc/m2×24 h×atm 0% RH; 23° C.;
O2TR 95 cc/m2×24 h×atm 60% RH; 38° C.

Example 10

Comparative

The packaging film comprising:
PHBH film (3-hydroxybutyrate and 3-hydroxyhexanoate copolymer) with a thickness of 30 μm including 10% chitosan and 3% alginate by weight,
external barrier lacquering as in example 4, weight 2 g/m².

The film has a SIT of 80° C. and, due to the application of the external barrier layer, it does not need to be metallized, nor to be coupled with PET.

The transmission features are:
WVTR 2 g/m2×24 h 90% RH; 38° C.;
O2TR 0.01 cc/m2×24 h×atm 0% RH; 23° C.;
O2TR 0.08 cc/m2×24 h×atm 60% RH; 38° C.

Example 11

Packaging film consisting of:
PHBH film including 10% chitosan by weight, 3% alginate by weight and 3% by weight of encapsulated ethanol,
external barrier lacquering as in example 4, weight 2 g/m², and
Inner release coating including encapsulated ethanol and chitosan grafted with PEG as per example 5, weight 3.5 g/m².

In the preparation of a flow-pack packaging, the inner release paint is applied only in the areas of the sheet that do not overlap in welding.

This film retains the welding properties of the film of example 10 with the following transmission features:
WVTR 1.8 g/m2×24 h 90% RH; 38° C.;
O2TR 0.01 cc/m2×24 h×atm 0% RH; 23° C.;
O2TR 0.06 cc/m2×24 h×atm 60% RH; 38° C.

Example 12

The following lacquers are added to the packaging film of example 11 in the non-welding area:
lacquer with oxygen scavenger activity as per example 6, weight 3.5 g/m²;
lacquer containing mix of active substances equal to those used in the film itself, weight 3 g/m².

This system retains the welding properties of example 10 with the following transmission properties:
WVTR 1.6 g/m2×24 h 90% RH; 38° C.;
O2TR 0.01 cc/m2×24 h×atm 0% RH; 23° C.;
O2TR 0.04 cc/m2×24 h×atm 60% RH; 38° C.

The PHA material, like PP or PET materials, may be coupled with other materials biodegradable in the marine environment and still retain the ability to inhibit mold and extend the shelf life that this system of technologies provides.

The additional lacquers or coatings can also be welding (heat or cold sealing) so as to avoid their positioning only in specific (not to be welded) areas of the packaging, and therefore they may have a dual function, that of welding and extension of shelf life.

Storage Tests

With the use of the packaging films according to the above examples, flow-pack packages were prepared made with a single sheet of dimensions 155×160 mm, longitudinally and transversely welded at the ends:
useful packaging volume: 240 cm³

In flow-pack packaging, a piece of bread weighing 25 g (volume 90 cm³) was introduced with water activity (aW) greater than 0.7.

Head space volume: 150 cm³.

The packages were placed in an environment with relative humidity of 60% at room temperature.

The following parameters were determined:
weight loss: weight loss of the package after one month (percentage referred to the initial weight);
days molds inhibition by contact: days of mold inhibition in the contact regions between the bread and the packaging sheet; the molds developed include aspergillus, penicillum and wallemie;
days molds inhibition by head space: days of inhibition of mold formation in the regions of bread in contact with the head space;
days with organoleptic properties: maintenance days of retention of the initial organoleptic properties; determination by a panel of tasters.

The results obtained are summarized in table 1, where the mean values of the above parameters are shown, obtained on three samples. The table also shows the parameters:
WVTR: water vapor transmission rate (g/m²×24 h 90% RH; 38° C.;)
O2TR: oxygen permeation rate (cc/m²×24 h×atm 0% RH; 23° C.);
O2TR stressed: oxygen permeation rate (cc/m²24 h×atm 60% RH; 38° C.);

The package obtained with the film of example 7 shows an average weight loss of 0.5% in a month; it is not able to preserve the bread from the absorption of external flavors and the loss of internal flavors. an average weight loss of 0.5% was recorded in a month. The presence of mold occurred at about 30 days both in the contact areas with the film and in the non-contact areas (head space).

For the package made with the film of example 8, an average weight loss of 0.2% in one month was measured. The presence of mold occurred in about 40 days both in the contact areas and in the non-contact areas.

For the package obtained with the film of example 9, an average weight loss substantially corresponding to that of the package of example 8 was measured; however, in areas where there is contact between the packaging film and the product, mold did not develop for 60 days, and in 40 days in non-contact regions.

For the package made with the film of example 10, there was an average weight loss of 0.35% in one month; in the contact areas, the presence of mold occurred in 70 days and in non-contact areas in 45 days.

For the package made with the film of example 11, there was an average weight loss of 0.30% in one month; in the contact areas, there were molds in 80 days and in non-contact areas in 50 days.

For the package made with the film of example 12, there was an average weight loss of 0.25% in one month; in the contact areas, there were molds in 80 days and in non-contact areas in 60 days.

The presence of volatile substance in the head space of the flow-pack, in combination with the fact that the product absorbs and traps volatile substances, is synonymous with activity in the head space system produced within the hermetic flow-pack linked to volatiles substances having inhibitory properties towards molds. This ensures a positive action on fungi and mold as well as upon simple contact over time.

|  | WVTR (9/m$^2$ ×) | O2TR (cc/m$^2$ ×) | O2TR STRESSED | SIT (° C.) | weight loss (%) | days molds inhibition by contact | days molds inhibition by | days with organoleptic propertie |
|---|---|---|---|---|---|---|---|---|
| Example 7 | 6 | 2000 | 3500 | 95 | 0.5 | 30 | 30 | 90 |
| Example 8 | 0.5 | 50 | 100 | 110 | 0.2 | 40 | 40 | 130 |
| Example 9 | 0.5 | 45 | 95 | 130 | 0.2 | 60 | 40 | 130 |
| Example 10 | 2 | 0.01 | 0.08 | 80 | 0.35 | 70 | 45 | 130 |
| Example 11 | 1.8 | 0.01 | 0.06 | 80 | 0.3 | 80 | 50 | 130 |
| Example 12 | 1.6 | 0.01 | 0.04 | 80 | 0.25 | 80 | 60 | 130 |

The invention claimed is:

1. Packaging material comprising:
   a) a core layer comprising a polymer matrix of polymeric material including at least one active substance having antimicrobial and/or antifungal activity dispersed in the polymer matrix,
   b) a coating applied to a side of said core layer obtained from a lacquer or a polymeric paint including fillers of a phyllosilicate or hydrotalcite,
   c) a coating for the release of an active antimicrobial and/or antifungal agent comprising encapsulated ethanol and a polymeric component selected from chitosan grafted with polyethylene glycol or cyclodextrin, a mixture of chitosan and polyethylene glycol and a polymer or mixture of polymers for printable paint applied to other side of the core layer.

2. Packaging material according to claim 1, characterized in that it further comprises:
   d) an oxygen scavenger coating applied to said coating c).

3. Packaging material according to claim 1 comprising:
   a polymeric coating e) including active substances having antimicrobial and/or antifungal activity, applied to said coating c) or respectively to said coating d).

4. Packaging material according to claim 1, wherein in said core layer a), the active substance is selected from the group consisting of chitosan, alginic acid or alginate, grapefruit seed extract, lemon peel essential oil or limonene, tea tree oil, cinnamon oil, thyme oil, encapsulated ethanol and mixtures thereof.

5. Packaging material according to claim 4, characterized in that said active substance is contained in said layer in an amount of from 1 to 30% by weight based on the weight of the polymer.

6. Packaging material according to claim 1, characterized in that said core layer is a film or sheet having a thickness comprised between 5 μm and 80 μm.

7. Packaging material according to claim 1, characterized in that said core layer a) comprises a polymer or mixture of polymers selected from the group consisting of polyethylene, polypropylene, polyethylene/polypropylene copolymers, polyesters, poly(lactic acid), polyhydroxyalkanoates and polycaprolactone.

8. Packaging material according to claim 1, wherein coating b) is obtained from a paint or lacquer comprising a polymer selected from polyethylene terephthalate, polyurethane, polyacrylate, nitrocellulose and vinyl polymers and including montmorillonite or hydrotalcite in an amount of from 3 to 30% by weight referred to the weight of the paint or lacquer.

9. Packaging material according to claim 1, characterized in that said coating b) has a weight greater than 0.4 g/m$^2$ and less than 3 g/m$^2$.

10. Packaging material according to claim 1, characterized in that said coating c) is obtained by applying a hydrogel comprising chitosan grafted with polyethylene glycol or cyclodextrin in an amount of from 40 to 60% by weight, encapsulated ethanol, in an amount of 1 at 6% by weight and an organic solvent or water.

11. Packaging material according to claim 10, characterized in that said organic solvent is selected from acetyl acetate, ethyl acetate and isopropyl alcohol.

12. Packaging material according to claim 1, characterized in that said coating c) has a weight of between 0.5 and 4 g/m$^2$.

13. Packaging material according to claim 2, characterized in that coating d) is obtained from a polymeric lacquer comprising a polymer selected from polyurethane, polyacrylates or polyester in water or in a solvent.

14. Packaging material according to claim 2, characterized in that said coating d) has a weight of between 0.3 and 4 g/m$^2$.

15. Packaging material according to claim 3, characterized in that said coating e) is obtained by applying a polymeric lacquer comprising a polyurethane, polyacrylic or polyester polymer in water or in solvent, an active substance selected from the group consisting of chitosan, alginic acid or alginate, grapefruit seed extract, lemon peel or limonene essential oil, tea tree oil, cinnamon oil, thyme oil, encapsulated ethanol and mixtures thereof in amounts of from 15 to 60% by weight, referred to the weight of said polymeric lacquer.

16. Packaging material according to claim 15, characterized in that said coating e) has a weight of between 0.5 and 4.5 g/m$^2$.

17. Sealed package comprising a wrapping made of a packaging material according to claim 1 and including a bakery product.

18. Sealed package according to claim 17 in the form of a flow-pack.

* * * * *